(12) United States Patent
Spielvogel

(10) Patent No.: US 9,441,756 B2
(45) Date of Patent: Sep. 13, 2016

(54) VALVE ARRANGEMENT

(71) Applicant: Robert Bosch GmbH, Stuttgart (DE)

(72) Inventor: Christian Spielvogel, Horb (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/643,357

(22) Filed: Mar. 10, 2015

(65) Prior Publication Data
US 2015/0226349 A1    Aug. 13, 2015

Related U.S. Application Data

(63) Continuation of application No. 13/641,599, filed as application No. PCT/EP2011/001609 on Mar. 30, 2011, now Pat. No. 8,985,138.

(30) Foreign Application Priority Data

Apr. 16, 2010 (DE) .................. 10 2010 015 196
Oct. 9, 2010 (DE) .................. 10 2010 048 068

(51) Int. Cl.
*F16K 51/00* (2006.01)
*F16K 31/122* (2006.01)
(Continued)

(52) U.S. Cl.
CPC ......... *F16K 31/122* (2013.01); *F15B 13/0835* (2013.01); *F16K 11/07* (2013.01); *F16K 27/02* (2013.01); *F16K 27/041* (2013.01); *F16K 31/1225* (2013.01); *F16K 31/363* (2013.01); *F16K 43/00* (2013.01); *F15B 11/165* (2013.01); *F15B 2211/20553* (2013.01); *Y10T 137/2557* (2015.04); *Y10T 137/598* (2015.04); *Y10T 137/7559* (2015.04); *Y10T 137/7668* (2015.04); *Y10T 137/87893* (2015.04)

(58) Field of Classification Search
CPC .............. F15B 11/165; F15B 13/0414; F15B 13/0835; F15B 2211/20553; F04B 49/002; F16K 31/122
USPC ........... 137/107, 454.2, 454.4, 454.6; 60/452
See application file for complete search history.

(56) References Cited

U.S. PATENT DOCUMENTS

| | | |
|---|---|---|
| 3,797,245 A | 3/1974 | Hein |
| 3,830,594 A | 8/1974 | Hein et al. |

(Continued)

FOREIGN PATENT DOCUMENTS

| | | |
|---|---|---|
| DE | 296 20 927 U1 | 5/1998 |
| DE | 101 36 416 A1 | 2/2003 |

(Continued)

OTHER PUBLICATIONS

International Search Report corresponding to PCT Application No. PCT/EP2011/001609, mailed Aug. 1, 2011 (German and English language document) (6 pages).

*Primary Examiner* — John K Fristoe, Jr.
*Assistant Examiner* — Reinaldo Sanchez-Medina
(74) *Attorney, Agent, or Firm* — Maginot, Moore & Beck LLP

(57) ABSTRACT

A valve arrangement includes at least two valves and a housing which is configured as an installation cartridge. One of the valves is configured as a pressure regulator and the other of the valves is configured as a delivery flow regulator. The valve arrangement is configured to be inserted or screwed into a variable-displacement pump, thereby minimizing the spatial requirement of the valve arrangement.

14 Claims, 4 Drawing Sheets

(51) Int. Cl.
*F15B 13/08* (2006.01)
*F16K 11/07* (2006.01)
*F16K 27/04* (2006.01)
*F16K 31/363* (2006.01)
*F16K 43/00* (2006.01)
*F16K 27/02* (2006.01)
*F15B 11/16* (2006.01)

(56) References Cited

U.S. PATENT DOCUMENTS

| | | |
|---|---|---|
| 3,866,419 A | 2/1975 | Paul |
| 3,998,241 A * | 12/1976 | Jones ................. F16K 11/18 137/454.6 |
| 5,142,963 A | 9/1992 | Piekutowski |
| 5,573,037 A | 11/1996 | Cole et al. |
| 6,168,400 B1 | 1/2001 | Van Davelaar et al. |
| 6,978,747 B2 | 12/2005 | Yager et al. |
| 7,383,858 B2 | 6/2008 | Hsueh |
| 7,555,899 B2 | 7/2009 | Maier et al. |
| 7,607,297 B2 | 10/2009 | Moya |
| 8,985,138 B2 * | 3/2015 | Spielvogel .......... F15B 13/0835 137/107 |

FOREIGN PATENT DOCUMENTS

| | | |
|---|---|---|
| DE | 20 2007 012 652 U1 | 12/2007 |
| DE | 10 2007 044 451 A1 | 3/2009 |
| GB | 2 367 095 A | 3/2002 |

* cited by examiner

VALVE ARRANGEMENT

This application is a continuation application of application Ser. No. 13/641,599, filed on Dec. 24, 2012 (now U.S. Pat. No. 8,985,138), which in turn is a 35 U.S.C. §371 National Stage Application of PCT/EP2011/001609, filed on Mar. 30, 2011, which claims the benefit of priority to Serial No. DE 10 2010 015 196.3, filed on Apr. 16, 2010 in Germany and Serial No. DE 10 2010 048 068.1, filed on Oct. 9, 2010 in Germany, the disclosures of which are incorporated herein by reference in their entirety.

BACKGROUND

The disclosure relates to a valve arrangement.

In valve arrangements according to the prior art, housings of cartridge design are known which can be inserted into an opening of a hydraulic apparatus.

DE 10 2007 044 451 A1 discloses a pressure control valve of this type with a housing of cartridge design which is screwed into a connection plate of a hydrostatic piston engine.

GB 2 367 095 A likewise discloses a pressure control valve and DE 296 20 927 U1 discloses a nonreturn valve of cartridge design.

It is a disadvantage of valves of this type that only one valve is accommodated in a cartridge.

Furthermore, it is known from the prior art to combine two valves in one housing. DE 101 36 416 A1 discloses a combination of this type comprising pressure control valve and delivery flow control valve. A housing of the two valves is configured in a flange design with single-sided connections. Since the housing has to be fastened to an outer surface of an associated hydraulic apparatus, the space requirement is correspondingly great.

In contrast, the disclosure is based on the object of providing a valve arrangement having at least two valves, the space requirement of which is minimized.

SUMMARY

This object is achieved by a valve arrangement having the features of the disclosure.

The valve arrangement according to the disclosure has a combination of at least two valves, a common housing of the two valves being configured as an insertion cartridge. The space requirement of the valves is minimized by way of this compact arrangement.

Further advantageous refinements of the disclosure are described in the dependent patent claims.

Each valve preferably has a control piston which can be moved in a valve bore.

It is particularly space-saving if the compact insertion cartridge is inserted partially or entirely into a hydraulic apparatus. The apparatus can be, for example, a variable displacement pump. In particular, it is therefore preferred if the insertion cartridge can be screwed about its center axis into the hydraulic apparatus.

In order to minimize the production outlay, it is preferred if the valve longitudinal axes of the valve bores run parallel to the center axis.

One preferred development of the valve arrangement according to the disclosure has connections which are connected to various or to all valve bores, with the result that the connections can be controlled by various or by all control pistons. In this way, the production outlay for the valve arrangement can be reduced further, and its insertion cartridge can be reduced further in size.

Depending on the design, it can be advantageous if the valve bores have different diameters.

In one particularly preferred exemplary embodiment having two valves, the valve arrangement according to the disclosure is a pressure/delivery flow regulator for a variable displacement pump. Here, in addition to a connection for a load signaling line, further connections are provided on the outer circumference of the insertion cartridge or on the end side.

In order to screw in the insertion cartridge, an apparatus for torque transmission is preferred which is arranged within an end-side face of the insertion cartridge. Since apparatuses for torque transmission are thus avoided on the outer edge and on the outer circumference of the insertion cartridge, the diameter of the insertion cartridge and, in particular, that of a receptacle for the insertion cartridge on the hydraulic apparatus are minimized.

Here, at least one circular-cylindrical section is preferred which is spaced apart from the center axis and on which or within the circumference of which an action face for a tool is formed.

Here, if the circular-cylindrical section forms an eccentric circular-cylindrical hole, the insertion cartridge is configured as an eccentric screw.

In another preferred variant, a setting screw is screwed into an associated valve bore and serves to set a parameter (for example, spring stress) of the corresponding valve. Here, a total of six circular-cylindrical sections are provided on a hexagon socket of the setting screw in each case between its edges. In this way, six action faces for the tool for screwing in the insertion cartridge are integrated into the hexagon socket, as a result of which the setting screw has a dual function.

In another variant with minimum outlay for the circular-cylindrical sections, the latter are arranged in the valve bores.

As one preferred addition to the valve arrangement according to the disclosure, a special key is proposed as tool, which special key has at least one projection with a circular-cylindrical section. Said projection can be brought into contact with at least one associated circular-cylindrical section of the insertion cartridge or can be inserted into the hole. In the variant with the hexagon socket, the projection of the tool is accordingly brought into contact here with six circular-cylindrical sections.

The valve bores and/or the eccentric holes can be configured as blind bores.

For screwing in, as an alternative or in addition to the circular-cylindrical sections, the insertion cartridge can have a dihedron with two flat sections.

As a simple securing means against the control pistons falling out, a stop pin is preferred which is arranged approximately transversely with respect to the valve bores and by way of which the travel of the control pistons in the valve bores is limited.

Here, it is simple is terms of production technology if the stop pin is pressed into a transverse bore of the insertion cartridge.

BRIEF DESCRIPTION OF THE DRAWINGS

In the following text, different exemplary embodiments of the disclosure will be described in detail using the figures, in which.

DETAILED DESCRIPTION

Figure 1:
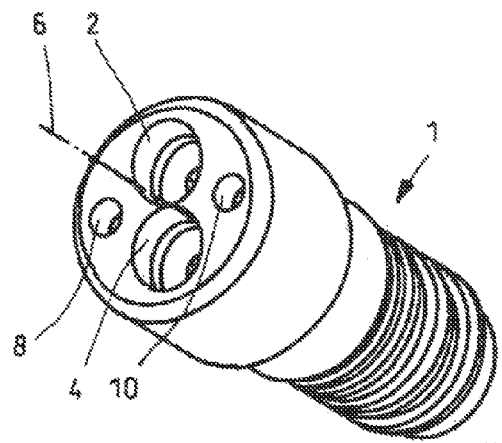
FIG. 1 shows a first exemplary embodiment of a valve arrangement according to the disclosure in a perspective view.
Figure 3:
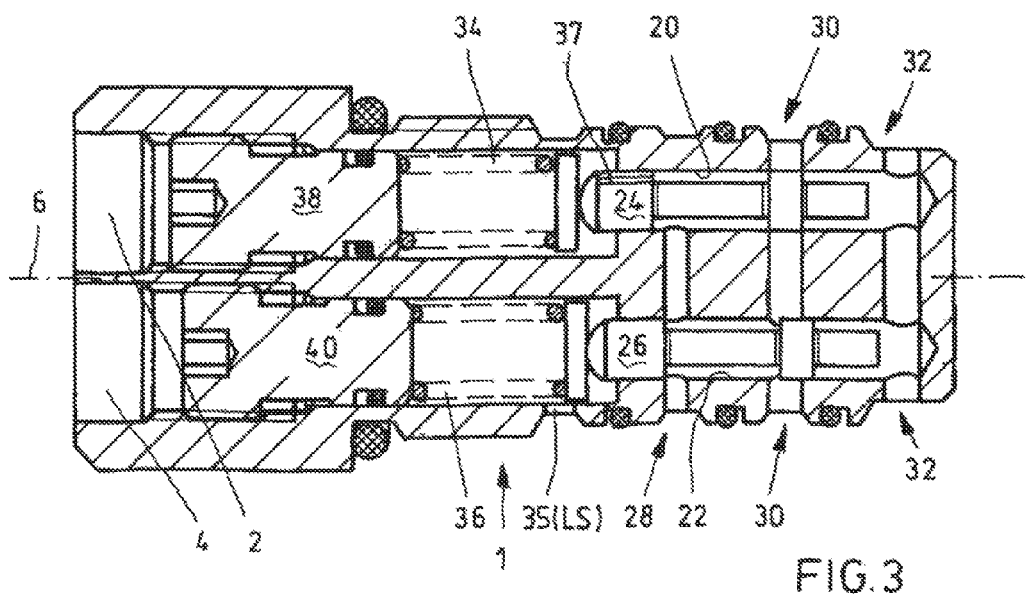
FIG. 3 shows the first exemplary embodiment of the valve arrangement according to the disclosure in a sectioned illustration.

FIG. 1 shows a first exemplary embodiment of a valve arrangement according to the disclosure in a perspective view. A housing of the valve arrangement is configured as an insertion cartridge 1 which can be screwed into an adjustable pump (not shown in greater detail). Here, the insertion cartridge 1 is rotated about its center axis 6. Different connections which will be explained with reference to FIG. 3 are arranged on an outer circumference of the insertion cartridge 1. Said connections are in pressure-medium connections with two different valves which are arranged together in the insertion cartridge 1.

Each valve has a valve bore 20, 22, which are shown in FIG. 3 and of which the end sections which are arranged on the end side can be seen in FIG. 1. Corresponding holes 2, 4 are therefore formed on the end side, which are arranged so as to lie diametrically opposite one another such that they are spaced apart from the center axis 6 of the insertion cartridge 1.

Furthermore, additional circular-cylindrical recesses or holes 8, 10 of small diameter are arranged on the end side on the insertion cartridge 1, which recesses or holes 8, 10 lie diametrically opposite one another with regard to the center axis 6 and are offset with respect to the holes 2, 4 by 90 degrees. The spacing of the axis of the respective hole 8, 10 from the center axis 6 is greater than the spacing of the respective hole 2, 4.

Figure 2:
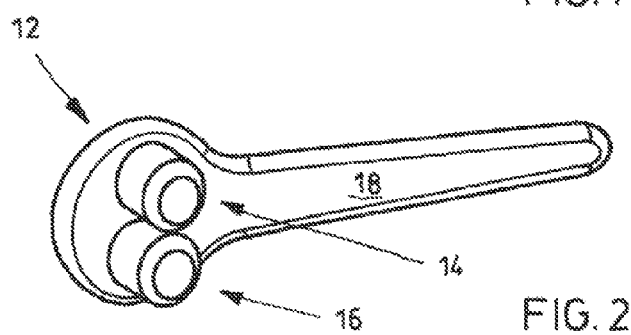
FIG. 2 shows a special key for the first exemplary embodiment of the valve arrangement according to the disclosure in a perspective view.

FIG. 2 shows a tool or a special key 12 which has two projections 14, 16 and a handle 18. Each projection 14, 16 has a circular-cylindrical outer circumferential face and a diameter which is somewhat smaller than the diameters of the two holes 2, 4 of the insertion cartridge (cf. FIG. 1). Here, the two projections 14, 16 are at a spacing from one another which corresponds to that of the two holes 2, 4. The two projections 14, 16 can therefore be inserted into the holes 2, 4 of the insertion cartridge 1, and the insertion cartridge 1 can subsequently be screwed via the handle 18 into the variable displacement pump (not shown).

As an alternative, the two holes 8 and 10 can also be used to screw in the insertion cartridge 1, for example if damage to the holes 2, 4 is to be feared. The special key then also has to be modified with respect to that special key shown in FIG. 2, in accordance with the other hole size and the other axial spacing.

In said first exemplary embodiment, the outer diameter of the insertion cartridge 1 is at a minimum, since no device for torque transmission (for example, an external hexagon) has to be attached to its outer circumference. Moreover, the insertion cartridge 1 of the first exemplary embodiment is screwed into the variable displacement pump in such a way that the end face of the insertion cartridge 1 lies approximately on one plane with the corresponding surface of the variable displacement pump. The required installation space of the valve arrangement according to the disclosure is therefore at a minimum.

FIG. 3 shows the first exemplary embodiment of the valve arrangement according to the disclosure in a sectioned illustration. Here, a control piston 24, 26 is received displaceably in each valve bore 20, 22 in a principally comparable way. They control the pressure-medium connections of three connections 28, 30, 32 which are arranged on the circumference of the insertion cartridge 1 and are arranged such that they are spaced apart from one another along their longitudinal axis 6.

Here, the control pistons 24, 26 are loaded firstly by the pressure of the connection 32 and secondly by the force of a respective spring 34, 36.

The prestress of the springs 34, 36 can be set via a respective setting screw 38, 40 which is screwed into a region of the respective valve bore 20, 22, which region is arranged adjacently to the respective end section or hole 2, 4. The spring space on the control piston 26 is open to the outside via a bore 35. Via said bore 35, the spring space and therefore the control piston 26 can be loaded by a control pressure, for example by the highest load pressure of all hydraulic consumers which are supplied at the same time by a pump, on which the valve arrangement is situated. The spring space with the spring 34 is connected to the connection 28 via a groove or flattened portion 37 on the control piston 24.

Figure 4:
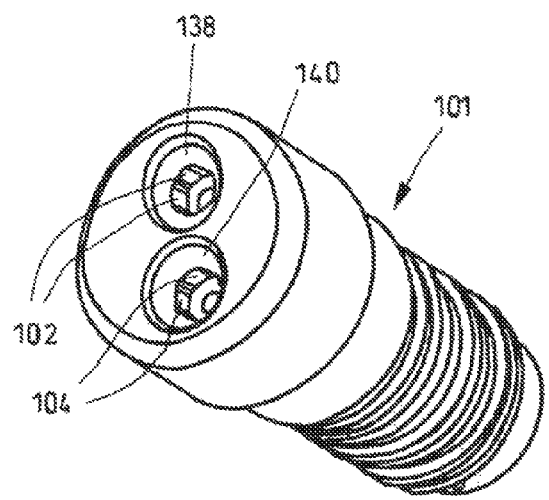
FIG. 4 shows a second exemplary embodiment of a valve arrangement according to the disclosure in a perspective view.

FIG. 4 shows a second exemplary embodiment of a valve arrangement according to the disclosure in a perspective view. One essential difference of the screw-in cartridge 101 in comparison with the screw-in cartridge 1 of the first exemplary embodiment consists in the fact that its length is shortened somewhat. Instead of the holes 2, 4 according to the first exemplary embodiment, special recesses are provided on two setting screws 138, 140. Each recess has firstly a conventional hexagon socket which serves to adjust the respective setting screw 138, 140, and secondly six integrated circular-cylindrical sections 102, 104. The latter are arranged in each case in such a way that together they form sections of a circular cylinder. A projection of a tool (not shown) which is similar to the tool 12 according to FIG. 2 can be inserted into each of said circular cylinders. The valve arrangement or the insertion cartridge 101 according to FIG. 4 can therefore be screwed into the variable displacement pump (not shown) and can be screwed out of it in the way which was explained in relation to the first exemplary embodiment.

Figure 5:
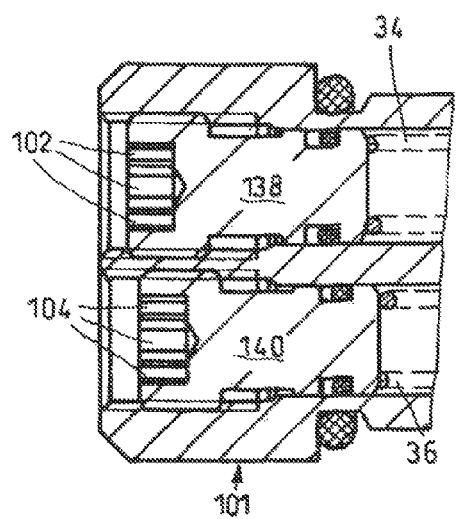
FIG. 5 shows a detail of the second exemplary embodiment of the valve arrangement according to the disclosure in a sectioned illustration.

FIG. 5 shows a detail of the second exemplary embodiment of the valve arrangement according to the disclosure in a sectioned illustration. The springs 34, 36 which are shown (only partially) and that part of the valve arrangement which is adjacent on the right (in FIG. 5) correspond to those of the first exemplary embodiment according to FIG. 3.

Figure 6:
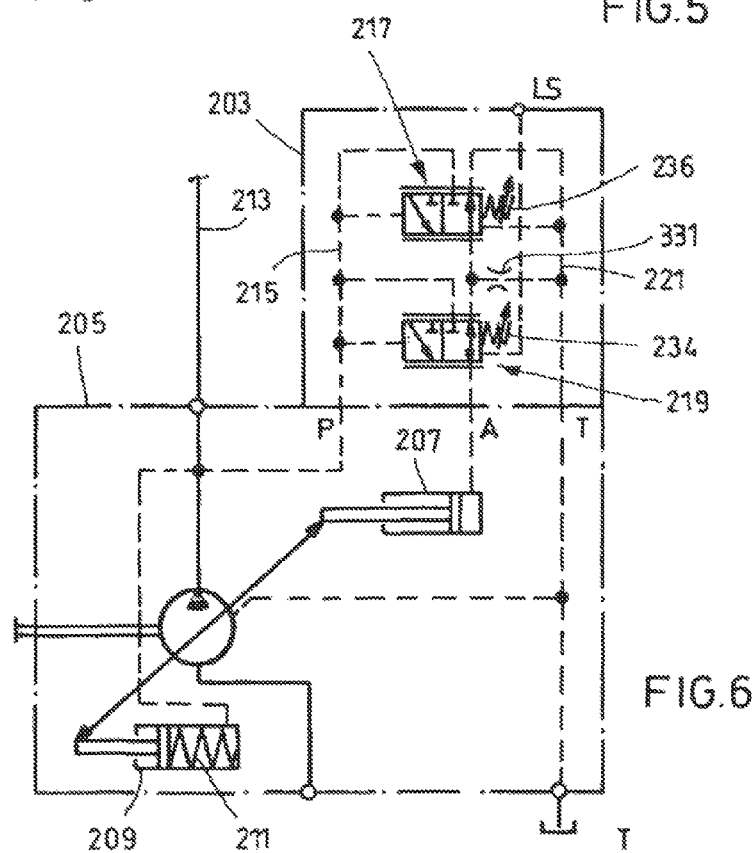
FIG. 6 shows a hydraulic circuit diagram of a third exemplary embodiment of a valve arrangement according to the disclosure with a variable displacement pump.

FIG. 6 shows a hydraulic circuit diagram of a third exemplary embodiment of a valve arrangement 203 according to the disclosure having a variable displacement pump 205. The circuit diagram of the valve arrangement 203 applies to the second variant shown in FIGS. 9 and 10 and largely to the first variants shown in FIGS. 7 and 8 of the third exemplary embodiment. A pivoting angle of the variable displacement pump 205 can be reduced or decreased via an actuating cylinder 207. This takes place via a pressure increase at the control pressure connection A of the variable displacement pump 205 or the valve arrangement 203. In contrast, the pivoting angle of the variable displacement pump 205 can be increased via a further actuating cylinder 209. To this end, a spring 211 of the actuating cylinder 209 and a pressure increase at the control pressure connection P of the variable displacement pump 205 or the valve arrangement 203 act in the direction of increasing the pivoting angle. The pressure or the delivery quantity at a working line 213 is regulated via the pivoting angle which is set in this way.

Furthermore, the valve arrangement 203 and the variable displacement pump 205 have a common tank connection T. Moreover, the valve arrangement 203 has a load signaling connection LS, via which the highest working pressure is signaled from a plurality of consumers which are supplied by the variable displacement pump 205 via the working line 213.

The valve arrangement 203 has a pressure control valve 217 and a delivery flow control valve 219. Both valves 217, 219 are configured as proportionally adjustable 3/2-way valves and have an adjustable spring 234, 236 which acts in the direction of the basic position (shown in FIG. 6) of a respective control piston of the valves 217, 219. In said two basic positions, the actuating cylinder 207 is relieved via the control pressure connection A, via the two valves 217, 219 and via a tank line 221 to the tank T, with the result that the pivoting angle of the variable displacement pump 205 is set to its maximum. The above-described control pressure which prevails at the load signaling connection LS likewise acts in the direction of the basic position which is shown of the delivery flow control valve 219.

Furthermore, the pump pressure in the working line 213 acts on the control pistons of the valves 217, 219 via the connection P and the control pressure line 215. Therefore, as the pump pressure of the working line 213 increases, the valves 217, 219 are set in such a way that pump pressure is increasingly connected via the control pressure connection P and the control pressure line 215 to the control pressure connection A, and the variable displacement pump 205 is therefore pivoted back.

Figure 7:
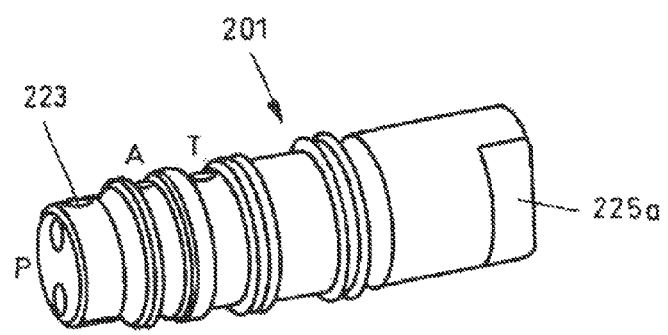
FIG. 7 shows the third exemplary embodiment of the valve arrangement according to the disclosure in a perspective view.

FIG. 7 shows both variants of the third exemplary embodiment of the valve arrangement 203 according to the disclosure (cf. FIG. 6) in a perspective view. The valve arrangement 203 has an insertion cartridge 201, on which the three pressure connections P, A and T are arranged. The control pressure connection P is provided on the end side for the pump pressure, each valve 217, 219 (cf. FIG. 6) being assigned a bore. Furthermore, the control pressure connection A for setting the pivoting angle of the variable displacement pump 205 and the tank connection T are arranged on the circumference.

Figure 8:
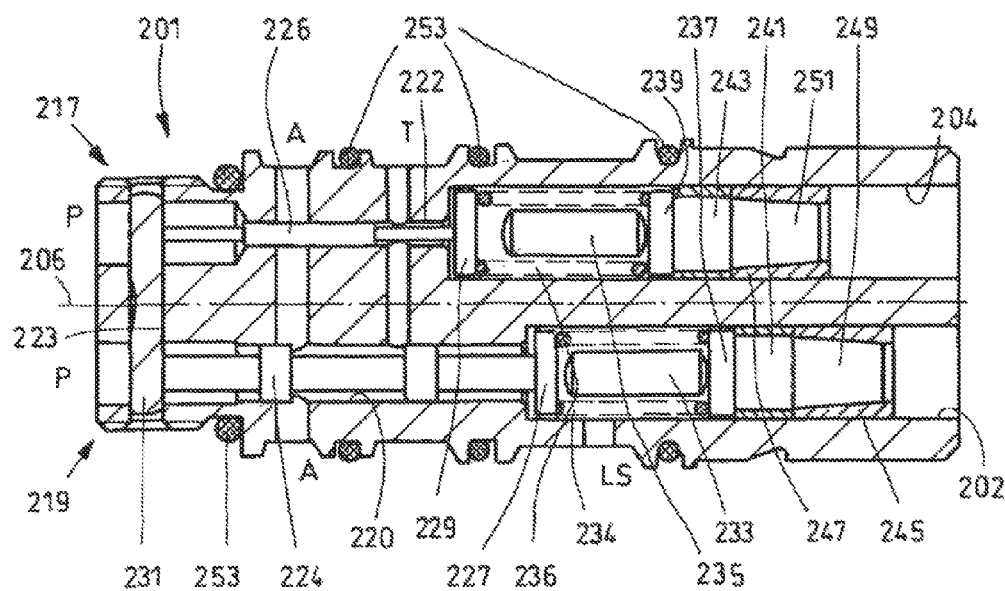
FIG. 8 shows a first variant of the third exemplary embodiment in a sectioned illustration.

A continuous transverse bore 223 which will be explained in relation to FIG. 8 is provided in the insertion cartridge 201 adjacently to the control pressure connection P.

A dihedron, of which only one flat section 225a is shown in FIG. 7, is provided in this third exemplary embodiment in order to screw in the insertion cartridge 201.

FIG. 8 shows the third exemplary embodiment of the valve arrangement according to the disclosure in accordance with FIGS. 6 and 7 in a first variant. The sectioned illustration shows a control piston 224 of the delivery flow control valve 219 and a control piston 226 of the pressure control valve 217. The control pistons 224, 226 are firstly prestressed to the left (in FIG. 8) via a substantially flat spring collar 227, 229 by the springs 234, 236 and can secondly be displaced proportionally to the right (in FIG. 8) into their switching positions via the control pressure which prevails at the control pressure connection P. Here, the movement of the control pistons 224, 226 to the left (in FIG. 8) is limited by a stop pin 231 which is pressed into the continuous transverse bore 223.

The movement of the control pistons 224, 226 and of the assigned spring collars 227, 229 to the right (in FIG. 8) counter to the force of the springs 234, 236 is limited by respective cylindrical stop pins 233, 235 which are received parallel to a center axis 206 of the insertion cartridge 201 in the interior of the respective spring 234, 236 without further fixing. Here, the springs 234, 235 are supported in each case on a disk 237, 239 which is supported in each case via a spacer sleeve 241, 243 on a respective conical sleeve 245, 247. The two conical sleeves 245, 247 are fixed frictionally in the respective valve bore 220, 222. To this end, the conical sleeves 245, 247 have frustoconical inner recesses, into which corresponding truncated cones 249, 251 are pressed. The pressing-in operation took place during the mounting of the insertion cartridge 201 by displacement or pulling of the truncated cones 249, 251 in the associated conical sleeves 245, 247 to the right (in FIG. 8).

In each case one sealing ring 253 is arranged on the outer circumference of the insertion cartridge 201 between the right-hand (in FIG. 8) or outer end section of the insertion cartridge 201 and the load signaling connection LS, and between the load signaling connection LS and the tank connection T, and between the tank connection T and the control pressure connection A, and between the control pressure connection A and the control pressure connection P.

A spring space of the delivery flow control valve 219 is connected via a transverse bore to the load signaling connection LS, whereas a spring space of the pressure control valve 217 is connected to the tank connection T via a pressure-medium connection which is formed between the control pistons 226 and the valve bore 222 and via a transverse-bore section.

By way of the basic positions, shown in FIG. 8, of the control pistons 224, 226, connections between the control pressure connections A and P are shut off by a respective piston collar of the two control pistons 224, 226, whereas the control pressure connection A is connected to the tank connection T via a pressure-medium connection which is formed between the control piston 224 and the valve bore 220 and, furthermore, via two transverse-bore sections, and is therefore relieved to the tank. By pressure loading of the control pressure connections P, the two control pistons 224, 226 can be displaced to the right (in FIG. 8) in each case counter to the force of the associated spring 234, 236, both valves 217, 219 opening a connection from the control pressure connection P to the control pressure connection A. The variable displacement pump 205 is therefore pivoted back, with the result that the pressure and/or the delivery flow in the working line 213 are/is reduced.

Figure 9:
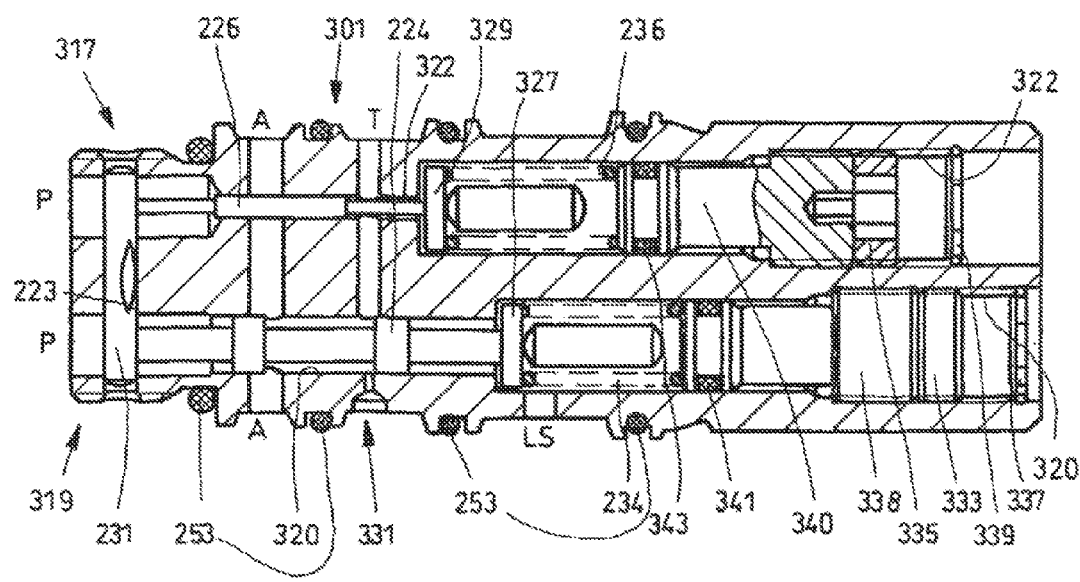
FIG. 9 shows a second variant of the third exemplary embodiment of a valve arrangement according to the disclosure in a sectioned illustration.

FIG. 9 shows a second variant of the third exemplary embodiment of a valve arrangement according to the disclosure in a sectioned illustration. Here, the following text will only discuss the differences of said second variant with respect to the first variant according to FIG. 8.

A transverse bore 331 is provided between the outer circumference of the insertion cartridge 301 and the pressure-medium connection which is formed between the valve bore 320 and the control piston 224 of the delivery flow control valve 319, which transverse bore 331, on account of its small diameter, represents a throttled connection between the pressure-medium connection and the tank connection T of the valve arrangement according to the disclosure.

Spring collars 327, 329 are formed in each case integrally with a stop pin, the action of which is consistent with that of the stop pins 233, 235 of the first variant according to FIG. 8.

Setting screws 338, 340 are screwed via a respective hexagon socket into the valve bores 320, 322 and therefore serve to set the respective prestress of the springs 234, 236. The setting screws 338, 340 are fixed by way of respective lock screws 333, 335 which are likewise screwed into the respective valve bore 320, 322. The lock screws 333, 335 in each case have a continuous hexagon socket which is larger than the respective hexagon socket of the setting screws 338, 340.

Furthermore, a securing ring 337, 339 is inserted into each valve bore 320, 322, with the result that the setting screws 338, 340 and their lock screws 333, 335 are secured against falling out and, in particular, against falling out in a pressure-loaded way.

Finally, the second variant of the third exemplary embodiment according to FIG. 9 has an intermediate piece between the respective spring 234, 236 and the associated setting screw 338, 340, with a sealing ring 341, 343 for sealing, in particular, that pressure space of the delivery flow control valve 319 which is loaded with load signaling pressure with respect to the surroundings.

Figure 10:
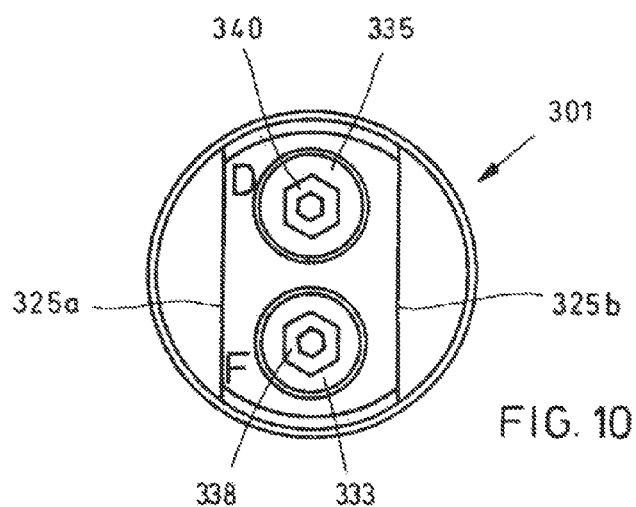
FIG. 10 shows the second variant of the third exemplary embodiment according to FIG. 9 in a view.

FIG. 10 shows the second variant of the third exemplary embodiment according to FIG. 9 in an end-side view. Here, the following features can be seen which lead to a compact construction of the second variant of the third exemplary embodiment of the insertion cartridge 301 according to the disclosure: the dihedron which consists of the two parallel flat sections 325a, 325b affords the possibility of bringing a special tool (not shown) into contact and of screwing in or screwing out the insertion cartridge 301. The stepped sizes firstly of the hexagon socket of the lock screws 333, 335 and secondly of the setting screws 338, 340 which are arranged such that they can be reached at the same time in the valve bores 320, 322 likewise contribute to a low installation space requirement of the two combined valves 317, 319.

In a difference from the first exemplary embodiment according to FIGS. 1 and 3, only the two holes 2, 4 which are formed by the valve bores 20, 22 or only the two smaller holes 8, 10 can be arranged on the end side of the insertion cartridge 1.

In a difference from the first variant of the third exemplary embodiment according to FIGS. 7 and 8, as an alternative to the dihedron, of which only one flat section 225a is shown in FIG. 7, the two valve bores 220, 222 can also be used as an apparatus for torque transmission, with the result that the insertion cartridge 201 can be screwed into the variable displacement pump via a special tool according to FIG. 2.

In a difference from the first variant of the third exemplary embodiment according to FIG. 8, sealing rings according to the sealing rings 341, 343 which are shown in FIG. 9 can also be provided on the disks 237, 239.

In a difference from the first variant of the third exemplary embodiment according to FIG. 8, a transverse bore according to the transverse bore 331 which is shown in FIGS. 6 and 9 can also be provided on the insertion cartridge 201 in order to form a throttle.

A valve arrangement is disclosed having at least two valves and having a housing which is configured as an insertion cartridge. The valve arrangement can have, for example, two valves, of which one is a pressure regulator and the other is a delivery flow regulator. A valve arrangement of this type can be inserted or screwed, for example, into a variable displacement pump, as a result of which the space requirement of the valve arrangement can be minimized.

The invention claimed is:

1. A cartridge valve arrangement, comprising:
    a cylindrical housing with a center axis configured as an insertion cartridge for sealed insertion into a cylindrical bore in a hydraulic apparatus;
    at least two valve bores within the housing, each of the at least two valve bores having a valve longitudinal axis which runs parallel to the center axis and is spaced apart from each other and from the center axis, wherein the at least two valve bores includes a first valve bore defining a first diameter and a second valve bore defining a second diameter different from said first diameter;
    a first control piston having a first sliding diameter configured to be received in sliding engagement with the first diameter of said first valve bore; and
    a second control piston having a second sliding diameter different from said first sliding diameter and configured to be received in sliding engagement with the second diameter of the second valve bore.

2. The cartridge valve arrangement as claimed in claim 1, wherein the insertion cartridge is configured to be screwed about its center axis into the bore of the hydraulic apparatus.

3. The cartridge valve arrangement as claimed in claim 1, wherein the valve longitudinal axes are identically spaced from the center axis.

4. The cartridge valve arrangement as claimed in claim 1, further comprising hydraulic connections which are connected between at least two of the at least two valve bores when the respective control piston is within the corresponding valve bore.

5. The cartridge valve arrangement as claimed in claim 1, wherein the valve arrangement is a pressure/delivery flow regulator and is configured to be screwed into a variable displacement pump.

6. The cartridge valve arrangement of claim 1, further comprising:
    an apparatus configured for torque transmission, the apparatus being arranged within an end-side face of the housing insertion cartridge and having at least one circular-cylindrical section which is spaced apart from the center axis and on which an action face configured for interaction with a tool for applying torque is formed.

7. The cartridge valve arrangement as claimed in claim 6, wherein the circular-cylindrical section defines a circular-cylindrical hole.

8. The cartridge valve arrangement as claimed in claim 6, further comprising six circular-cylindrical sections which are arranged on a hexagon socket of a setting screw which is screwed into one of the at least two valve bores.

9. The cartridge valve arrangement as claimed in claim 6, wherein the circular-cylindrical section is arranged on one of the at least two valve bores.

10. The cartridge valve arrangement as claimed in claim 6, wherein the tool has at least one projection with a circular-cylindrical section which is configured to be brought into contact with at least one associated circular-cylindrical section of the insertion cartridge.

11. The cartridge valve arrangement as claimed in claim 7, wherein one or more of the valve bores and/or the holes are configured as blind bores.

12. The cartridge valve arrangement as claimed in claim 1, wherein the insertion cartridge has a dihedron.

13. The cartridge valve arrangement as claimed in claim 1, further comprising a stop pin arranged approximately transversely with respect to the at least two valve bores.

14. The cartridge valve arrangement as claimed in claim 13, wherein the stop pin is pressed into a transverse bore of the insertion cartridge.

\* \* \* \* \*